Oct. 6, 1925.
V. A. ROHLIN
1,556,034
LIQUID TREATING SYSTEM
Filed Jan. 25, 1923 2 Sheets-Sheet 1
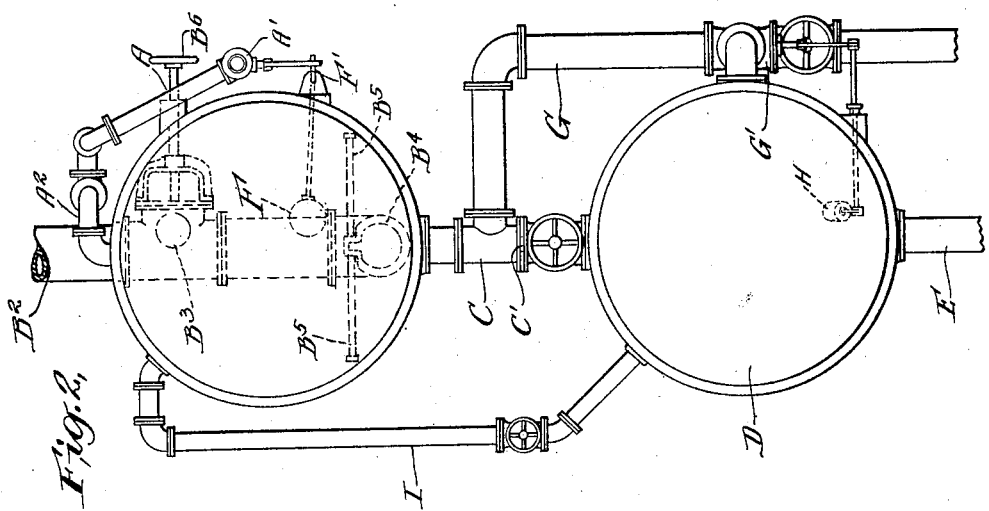
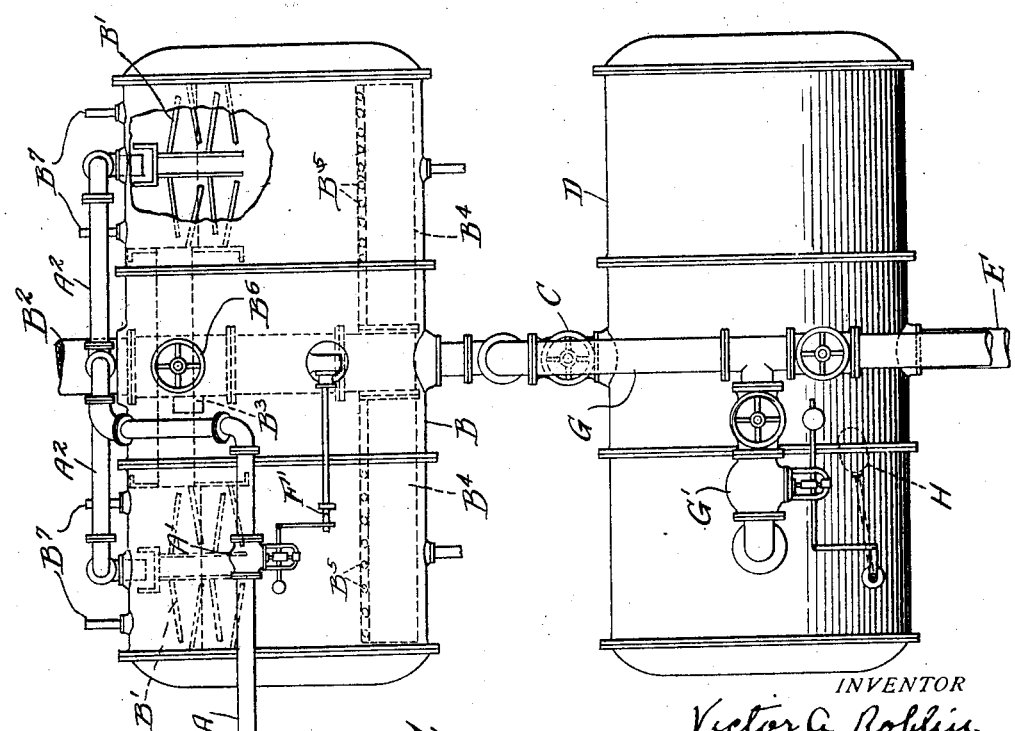
INVENTOR
BY Victor A. Rohlin
J. E. Hubbell
ATTORNEY Oct. 6, 1925.　　　　　　　1,556,034
V. A. ROHLIN
LIQUID TREATING SYSTEM
Filed Jan. 25, 1923　　2 Sheets-Sheet 2
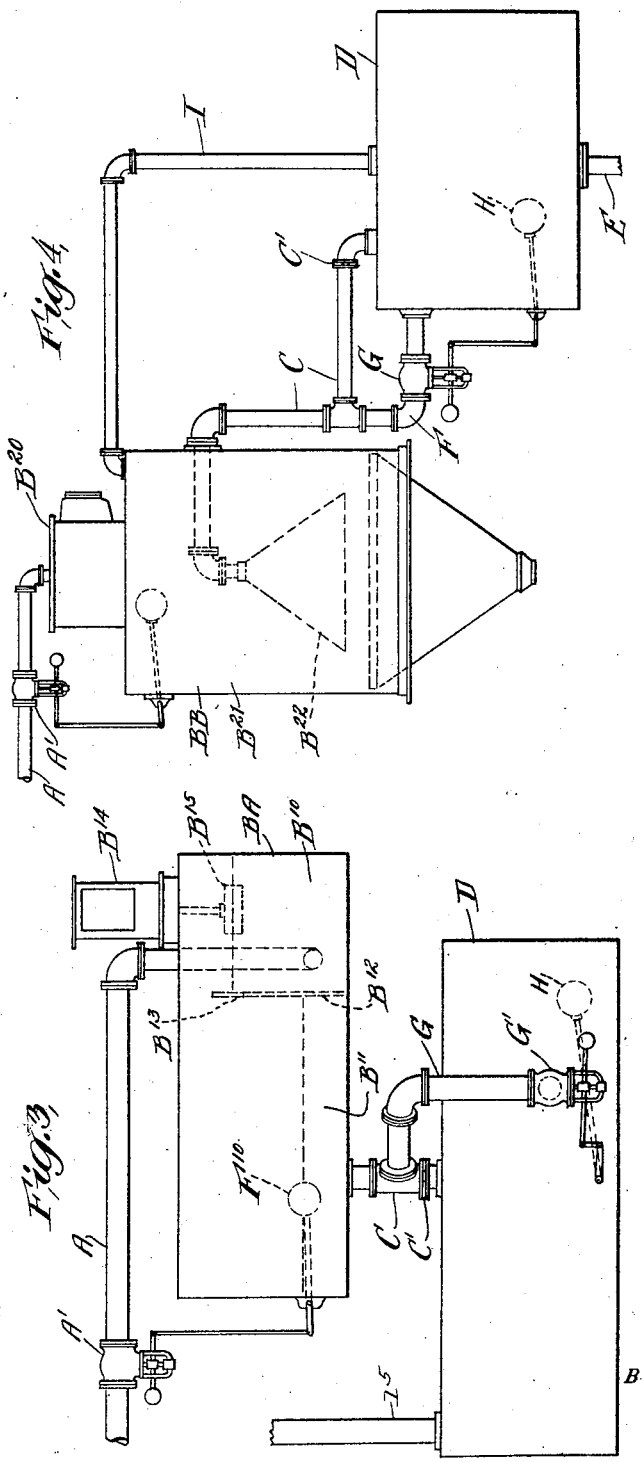
INVENTOR
BY Victor A. Rohlin
J. E. Hubbell
ATTORNEY Patented Oct. 6, 1925.

1,556,034

UNITED STATES PATENT OFFICE.

VICTOR A. ROHLIN, OF PHILADELPHIA, PENNSYLVANIA, ASSIGNOR TO COCHRANE CORPORATION, OF PHILADELPHIA, PENNSYLVANIA, A CORPORATION OF PENNSYLVANIA.

LIQUID-TREATING SYSTEM.

Application filed January 25, 1923. Serial No. 614,843.

*To all whom it may concern:*

Be it known that I, VICTOR A. ROHLIN, a citizen of the United States, and resident of Philadelphia, in the county of Philadelphia and State of Pennsylvania, have invented certain new and useful Improvements in Liquid-Treating Systems, of which the following is a specification.

In many liquid treating operations, as in heating, deaerating or filtering boiler feed water, or in measuring boiler fuel water in a weir meter, it is common practice to divide the system as a whole, into which I may call a supply system and a distributing system; the supply system including the heater, deaerating chamber, filter, weir meter or other treating vessel, and the conduit for supplying water to the treating vessel, while the distributing system includes a storage reservoir receiving liquid from the treating vessel and delivering it to an outlet conduit through which the demand for treated liquid is supplied.

The object of the present invention is to improve a system of the type referred to, by providing means for passing liquid from the treating vessel into the storage reservoir in such manner that, regardless of how rapidly liquid may be withdrawn from the storage reservoir in response to temporary increases in the demand for the liquid, the rate of liquid flow through the treating vessel will not exceed a predetermined maximum permitting efficient operation of the treating vessel, unless and until the storage reservoir is substantially emptied, while thereafter and until the demand again diminishes to said predetermined maximum, liquid will nevertheless be supplied to the distributing system as required to meet the demand.

By proceeding in accordance with the present invention, I am able, with apparatus comprising a storage reservoir of comparatively moderate size, to properly heat, deaerate, or otherwise treat the liquid handled at all times, except occasionally when the demand for treated liquid exceeds the normal capacity of the treating vessel for an unduly prolonged period, and at such times I can still supply the demand for liquid although the liquid then supplied will be, in whole or in part, either untreated or inefficiently treated.

The various features of novelty which characterize my invention are pointed out with particularity in the claims annexed to and forming a part of this specification. For a better understanding of my invention, however, and its advantages, and specific objects attained with its use, reference should be had to the accompanying drawings and descriptive matter in which I have illustrated and described preferred embodiments of my invention.

Of the drawings:

Fig. 1 is an elevation with parts broken away and in section of water heating and deaerating apparatus;

Fig. 2 is an end elevation of the apparatus shown in Fig. 1;

Figs. 3 and 4 are diagrammatic elevations illustrating the application of the present invention to systems comprising, respectively, a weir meter and a water softener.

In the drawings and referring first to the construction shown in Figs. 1 and 2, A represents the water supply conduit to a tank B which serves as a heating and deaerating chamber or vessel. From the tank B the treated liquid normally passes through a conduit connection C into a tank D which serves as a storage reservoir, from which water is withdrawn through the outlet conduit E by a boiler feed pump (not shown) or the like, as required to meet the demand for heated and deaerated water. The flow capacity of the conduit connection C between the tanks B and D, is restricted as by means of an inserted measuring orifice disc C' so that it will not pass water in excess of the maximum capacity of the tank B to heat and deaerate the water with a desirable efficiently. The supply of water to the vessel by the supply pipe A is automatically regulated in response to the accumulation of liquid in the bottom of the vessel B as by means of a float F which through mechanical connections F', opens and closes a flow regulating valve A' in the pipe A as the water level in the lower portion of the vessel B falls below, or rises above a predetermined normal. A conduit G including a normally closed valve G' connects the tank B to the reservoir D in such manner as to form a by-pass about the measuring orifice C'. The valve G' is controlled by a float H responsive to the accmulation of liquid in the reservoir D, and arranged to hold the valve G' closed except when the reservoir D is practically empty.

The particular form of deaerating heater shown in Figs. 1 and 2, is of the open feed water type and comprises two banks of water spreading trays B' in the upper portion of the tank B, one bank being adjacent each end of the tank which is horizontally disposed. The water supplied by the conduit A passes to inlets of the tank B above the two banks of trays B', through branches A² of the supply pipe A. Steam, which ordinarily is exhaust steam, is supplied to the tank B through a steam supply connection B² having an outlet B³ opening into the tank B above the water level therein and having lower branches B⁴ to which horizontally disposed spray pipes B⁵ are connected. The branches B⁴ and spray pipes B⁵ constitute a spray discharge manifold normally submerged in the body of liquid maintained in the bottom of the tank B. B⁶ represents a valve by which the relative amounts of steam supplied to the tank B through the outlet B³ and through the spray nozzles may be regulated. The steam entering the tank chamber through the outlet B³, is drawn upward through the trays B' by the vacuum of condensation effected by the water passing downward over the trays B' and the air liberated from the water in the tank B is removed through the outlets B' opening from the tank B above the tray banks B' and ordinarily connected to an air pump, ejector or other air exhausting device, (not shown). I represents a conduit for equalizing the vapor pressure in the tanks B and D when the latter is only filled partially with water.

The efficient operation of the deaerating heater shown in Figs. 1 and 2 requires that the water to be deaerated should not pass through the deaerating heater too rapidly to permit it to be effectively scrubbed by the steam and to give sufficient time for the escape of air entrained in the water.

The above mentioned features of construction and arrangement of the deaerating heater do not of themselves form any part of the present invention and have been shown and referred to herein merely by way of illustration of apparatus with which the present invention may be used with especial advantage.

An understanding of some of the practical advantages of my invention may be facilitated by the following consideration of conditions of operation commonly met with in the use of such apparatus as is shown in Figs. 1 and 2.

Assume, for example, a properly designed plant in which the maximum capacity for operation with the desired efficiency of the deaerating heater B, is at the rate of 260,000 lbs. of water per hour. In such case I employ a connection C having a maximum gravity discharge under the head to which it is subjected, at the rate of 260,000 lbs. of water per hour. With the apparatus so proportioned, during periods of operation in which the demand for water withdrawn from the reservoir D is not in excess of the rate of 260,000 lbs. per hour, the reservoir D will be constantly filled with water, and the water level in the lower portion of the deaerating heater B will vary only as required to so adjust the valve A' through the float F as to make the supply of water to the deaerating heater vary in proportion to the rate of discharge from the reservoir D through the conduit E.

When the rate at which water is withdrawn from the reservoir D increases above 260,000 lbs. per hour, the connection C will continue to pass water from the deaerating heater B into the reservoir at the rate of 260,000 lbs. per hour, unless and until the reservoir D is emptied sufficiently to cause the float H to open the by-pass valve G'. The extent to which the valve G' is then opened will be that required to make the rate of supply of water to the heater D through the connection C and through the by-pass G, equal to the rate at which water is being withdrawn from the tank D. As soon thereafter as the rate at which water is withdrawn falls below 260,000 lbs. per hour, water will begin to accumulate in the reservoir D, and if the demand continues at the diminished rate long enough, the valve G' will close, and the reservoir D will again fill with water. During the period in which the reservoir D is filling up the deaerating heater will receive water at practically the rate of 260,000 lbs. per hour regardless of the actual rate at which water is then being withdrawn from the reservoir D. When the demand for water in excess of the capacity of the deaeration heater B for efficient operation continues after the reservoir D is empty, water will be supplied to meet the demand, but this demand will be met by water passing through the deaeration heater too rapidly to secure the desired efficiency in deaeration.

In practice, however, this temporary decrease in deaeration efficiency is less objectionable, in many installations, than the cost and bulk of a reservoir D of sufficiently large capacity to make it possible to supply the demand for water at all times without exceeding the maximum flow through the deaerating heater permitting the desired deaeration efficiency.

The apparatus shown in Fig. 3 differs from that shown in Fig. 1 in that the deaerating heater B of Figs. 1 and 2 is replaced in Fig. 3 by a weir tank BA. The tank BA is divided into inlet and outlet chambers $B^{10}$ and $B^{11}$ by an interposed weir plate $B^{12}$. The water to be measured is supplied to the compartment $B^{10}$ by the supply pipe valve A at a rate dependent on the adjustment of the valve A' which is controlled by a float $F^{10}$ responsive to the height of water level in the compartment $B^{11}$ into which the water flows from the compartment $B^{10}$ over the top, or through a suitable notch or orifice $B^{13}$ in the weir plate $B^{12}$. The rate of flow through the weir tank is indicated, registered or recorded by the usual mechanism in the instrument case $B^{14}$, and the float $B^{15}$ responsive to the height of liquid level in the compartment $B^{10}$. From the weir outlet chamber $B^{11}$, water passes to a reservoir D through a conduit C including a measuring orifice C' alone or through a bypass G and valve G' actuated by a float H as in the construction first described. $I^5$ represents a pipe connection to the reservoir D which may serve as an air vent to the atmosphere, or as a pressure equalizing connection to the meter.

With the form of my apparatus shown in Fig. 3, I am enabled to accurately meter water passing through the apparatus, by means of a weir meter and storage reservoir of water capacity with reasonable satisfactory accuracy unless the rate at which water is withdrawn from the storage reservoir D continues in excess of the efficient capacity.

In the use of my invention in connection with apparatus of the character shown in Fig. 3, I ordinarily make the maximum load capacity of the discharge connection C approximately equal to the rate of flow over the weir which is the maximum permitting of the desired accuracy in measuring. In such case accurate measurements will then be obtained of the rate of flow over the weir during periods in which the demand supplied from the reservoir D is in excess of said maximum flow over the weir permitting accurate measurement, unless and until such periods are so prolonged as to empty the reservoir D and thereby cause the bypass valve G' to open. During the periods in which the valve G' is open, the weir meter will not measure the flow with the accuracy desired but in many cases this will be less objectionable in practice, than it would be to provide a reservoir D of great enough capacity to make the bypass G and valve G' unnecessary. The invention has a special advantage in connection with the weir meter in that it tends to minimize fluctuations in the rate of flow over the weir when that rate of flow is relatively large, which is conducive to accurate measurements.

In the form of my invention illustrated in Fig. 4, the deaerating heater of Figs. 1 and 2 is replaced by a water softener BB shown as comprising an open feed water heater $B^{20}$ open at its lower end to a settling tank $B^{21}$. The latter is provided with a bell outlet conduit $B^2$ which is connected by restricted flow connection C and bypass G to a reservoir D which, with the associated parts, may be similar to the correspondingly designated parts of the apparatus shown in Figs. 1 and 2. In the apparatus shown in Fig. 4 as in that shown in Figs. 1 and 2, the maximum rate of flow through the water softener permitting the efficient operation of the latter is not exceeded, except when the excess demand for water continues after the reservoir D has been emptied.

While in accordance with the provisions of the statutes, I have illustrated and described the best forms of my invention now known to me, it will be apparent to those skilled in the art, that changes may be made in the form of the apparatus disclosed without departing from the spirit of my invention as set forth in the appended claims, and that some features of my invention may sometimes be used to advantage without a corresponding use of other features.

Having now described my invention, what I claim as new and desire to secure by Letters Patent, is:

1. In apparatus comprising a liquid supply system including a liquid treating vessel and a liquid distributing system including a storage reservoir, the improvement which consists in a connection of definitely restricted flow capacity between said vessel and reservoir through which liquid normally passes from the supply system to the distributing system, the flow capacity of said connection being sufficient to supply the average demand, but insufficient to supply an occasional excess demand of said distributing system and other provisions for passing liquid from said system to said distributing system comprising a normally closed bypass about said connection and means responsive to the accumulation of liquid in said reservoir for opening said bypass during periods in which said accumulation falls below a predetermined minimum.

2. Apparatus for heating and deaerating water, comprising a deaerating heater of open feed water type, a storage reservoir, a conduit connection of restricted flow capacity through which water is discharged by gravity from said heater into said reservoir, a vapor pressure equalizing connection between said reservoir and heater, a water supply connection to said heater, means responsive to the accumulation of water in said heater for increasing and diminishing the flow of water to the heater through said supply connection as the accumulation of water therein falls below or rises above a predetermined amount, a second and normally closed discharge connection from said heater to said reservoir, and means responsive to the accumulation of water in said reservoir for opening said second connection during periods in which the water held in said reservoir falls below a predetermined minimum.

Signed at Philadelphia in the county of Philadelphia and State of Pennsylvania this 22d day of January A. D. 1923.

VICTOR A. ROHLIN.